United States Patent
Chen et al.

(10) Patent No.: US 11,763,270 B2
(45) Date of Patent: Sep. 19, 2023

(54) SYSTEMS AND METHODS FOR FACILITATING GENERATION OF A CARBON OFFSET BASED ON PROCESSING OF A RECYCLABLE ITEM

(71) Applicants: Stanley Chen, New york, NY (US); Jan-Robin Gerards, New york, NY (US)

(72) Inventors: Stanley Chen, New york, NY (US); Jan-Robin Gerards, New york, NY (US)

(73) Assignee: RecycleGO Inc., Irvington, NJ (US)

( * ) Notice: Subject to any disclaimer, the term of this patent is extended or adjusted under 35 U.S.C. 154(b) by 155 days.

(21) Appl. No.: 16/874,640

(22) Filed: May 14, 2020

(65) Prior Publication Data
US 2021/0357880 A1     Nov. 18, 2021

(51) Int. Cl.
*G06Q 10/00* (2012.01)
*G06Q 10/04* (2012.01)
(Continued)

(52) U.S. Cl.
CPC ....... *G06Q 10/30* (2013.01); *G06K 19/06028* (2013.01); *G06Q 10/047* (2013.01);
(Continued)

(58) Field of Classification Search
CPC ............... G06Q 10/30; G06Q 10/047; G06K 19/06028; H04W 4/029; H04L 9/0643; H04L 2209/38
(Continued)

(56) References Cited

U.S. PATENT DOCUMENTS 8,738,432 B2 * 5/2014 Hamilton, II .......... G06Q 90/00
  705/14.1
2005/0111618 A1 * 5/2005 Sommer, Jr. ............ B64F 1/368
  378/57
(Continued)

FOREIGN PATENT DOCUMENTS

CN    202244644 U  *  5/2012
CN    204539480 U  *  8/2015
(Continued)

OTHER PUBLICATIONS

The Carbon footprint of e-waste recycling—Indian Scenarios, IEEE Conferences, Sep. 1, 2012, abstract, 2012. (Year: 2012).*
(Continued)

*Primary Examiner* — Tan D Nguyen
(74) *Attorney, Agent, or Firm* — Dhiraj Jindal; Patent Yogi LLC

(57) ABSTRACT

Disclosed herein is a method for facilitating generation of a carbon offset based on processing of a recyclable item. Accordingly, the method may include receiving, using a communication device, transportation data associated with transportation of at least one recyclable item from at least one first device. Further, the method may include analyzing, using a processing device, the transportation data. Further, the method may include determining, using the processing device, a carbon value associated with the transportation of the at least one recyclable item based on the analyzing. Further, the method may include generating, using the processing device, a net $CO_2e$ offset associated with the at least one recyclable item based on the carbon value. Further, the method may include storing, using a storage device, the net $CO_2e$ offset associated with the at least one recyclable item in a distributed ledger.

16 Claims, 12 Drawing Sheets

(51) Int. Cl.
*G06K 19/06* (2006.01)
*H04W 4/029* (2018.01)
*H04L 9/06* (2006.01)
*H04L 9/00* (2022.01)

(52) U.S. Cl.
CPC ........... *H04L 9/0643* (2013.01); *H04W 4/029* (2018.02); *H04L 9/50* (2022.05)

(58) Field of Classification Search
USPC ........................................................ 705/308
See application file for complete search history.

(56) References Cited

U.S. PATENT DOCUMENTS

| | | | | |
|---|---|---|---|---|
| 2008/0198021 A1* | 8/2008 | Flood | ................... | G06F 16/9554 340/572.7 |
| 2010/0127868 A1* | 5/2010 | Hamilton, II | .......... | G06Q 10/06 340/572.1 |
| 2011/0184784 A1* | 7/2011 | Rudow | ................... | G06Q 30/02 705/7.38 |
| 2012/0029985 A1* | 2/2012 | Wilson | ................... | G06Q 10/30 705/14.11 |
| 2013/0080296 A1* | 3/2013 | Dickerson | .......... | G06Q 30/0208 705/30 |
| 2019/0102749 A1* | 4/2019 | Vijayan | ................... | G06Q 10/20 |
| 2019/0287149 A1* | 9/2019 | Papp | ................... | G06Q 30/0619 |
| 2020/0148072 A1* | 5/2020 | Ashley | ................... | G06Q 50/06 |

FOREIGN PATENT DOCUMENTS

| | | | | |
|---|---|---|---|---|
| CN | 105865476 A | * | 8/2016 | ......... G01C 21/3469 |
| CN | 108307865 A | * | 7/2018 | ............. A01G 24/20 |
| WO | WO-2017017766 A1 | * | 2/2017 | ............. G01S 17/66 |

OTHER PUBLICATIONS

Joel Edwards, "Life Cycle Inventory . . . Decision Support Methods Beyond the Waste Hierarchy", Nov. 2017, Waste Management, vol. 69, pp. 577-591. (Year: 2017).*

Gaines, Linda "Life-cycle Analysis for Lithium-Ion Battery Production and Recycling", 2010, Chemical and Engineering Sciences Division, Argonne National Laboratory, pp. 1-18. (Year: 2010).*

Roberto Minunno, "Strategies for Applying the Circular Economy to Prefabricated Buildings," Sep. 6, 2018, The Buildings, pp. 1-14 (Year: 2018).*

* cited by examiner

| Emission 1202 | PET Bottle / Filament 1204 | HDPE 1206 | LDPE 1208 | PP 1210 | PS 1212 | PVC 1214 | Other Plastics 1216 |
|---|---|---|---|---|---|---|---|
| Virgin 1218 | 2150/2050 1222 | 1800 1224 | 1870 1226 | 1630 1228 | 3300 1230 | 1900 1232 | 4860 1234 |
| Recycled 1220 | 510/280 1236 | 348 1238 | 348 1240 | 348 1242 | 348 1244 | 348 1246 | 348 1248 |

FIG. 12

SYSTEMS AND METHODS FOR FACILITATING GENERATION OF A CARBON OFFSET BASED ON PROCESSING OF A RECYCLABLE ITEM

TECHNICAL FIELD

Generally, the present disclosure relates to the field of data processing. More specifically, the present disclosure relates to systems and methods for facilitating generation of a carbon offset based on processing of a recyclable item.

BACKGROUND

Recycling is an effective action to restrict greenhouse gas emissions by removing the requirement to bury or incinerate waste. This leads to a reduction in nitrous oxide and carbon dioxide emissions. Additionally, recycling avoids energy-intensive manufacturing steps including processing of raw material and allowing processing of material for less energy.

Existing techniques for facilitating generation of a carbon offset based on processing of a recyclable item are deficient with regard to several aspects. For instance, current technologies do not allow for maintaining of a transparent ledger of accounting for recycling activity, utilizing sensors to gauge quality and quantity of the recyclable item, and aligning objectives of stakeholders like governments, hauling companies, Material Recovery Facilities, businesses, and individuals involved in the recycling process of the recyclable item. Further, current technologies do not allow for scanning of a product bar code of the recyclable item to derive product information of the recyclable item and writing it on to a distributed ledger.

Therefore, there is a need for improved systems and methods for facilitating generation of a carbon offset based on processing of a recyclable item that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for facilitating generation of a carbon offset based on processing of a recyclable item, in accordance with some embodiments. Accordingly, the method may include a step of receiving, using a communication device, transportation data associated with transportation of at least one recyclable item from at least one first device. Further, the method may include a step of analyzing, using a processing device, the transportation data. Further, the method may include a step of determining, using the processing device, a carbon value associated with the transportation of the at least one recyclable item based on the analyzing. Further, the method may include a step of generating, using the processing device, a net $CO_2e$ offset associated with the at least one recyclable item based on the carbon value. Further, the method may include a step of storing, using a storage device, the net $CO_2e$ offset associated with the at least one recyclable item in a distributed ledger.

Further disclosed herein is a system for facilitating generation of a carbon offset based on processing of a recyclable item, in accordance with some embodiments. Accordingly, the system may include a communication device, a processing device, and a storage device. Further, the communication device may be configured for receiving transportation data associated with transportation of at least one recyclable item from at least one first device. Further, the transportation data may include vehicle data associated with at least one vehicle used for transportation of the at least one recyclable item. Further, the vehicle data may include at least one vehicle type associated with the at least one vehicle, at least one fuel type associated with the at least one vehicle, and at least one vehicle travel characteristic associated with the at least one vehicle. Further, the processing device may be configured for analyzing the transportation data. Further, the processing device may be configured for determining a carbon value associated with the transportation of the at least one recyclable item based on the analyzing. Further, the processing device may be configured for generating a net $CO_2e$ offset associated with the at least one recyclable item based on the carbon value. Further, the storage device configured for storing the net $CO_2e$ offset associated with the at least one recyclable item in a distributed ledger.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 12 is a table listing providing carbon values of multiple recyclable items in accordance with exemplary embodiments.

DETAILED DESCRIPTION

Figure 1:
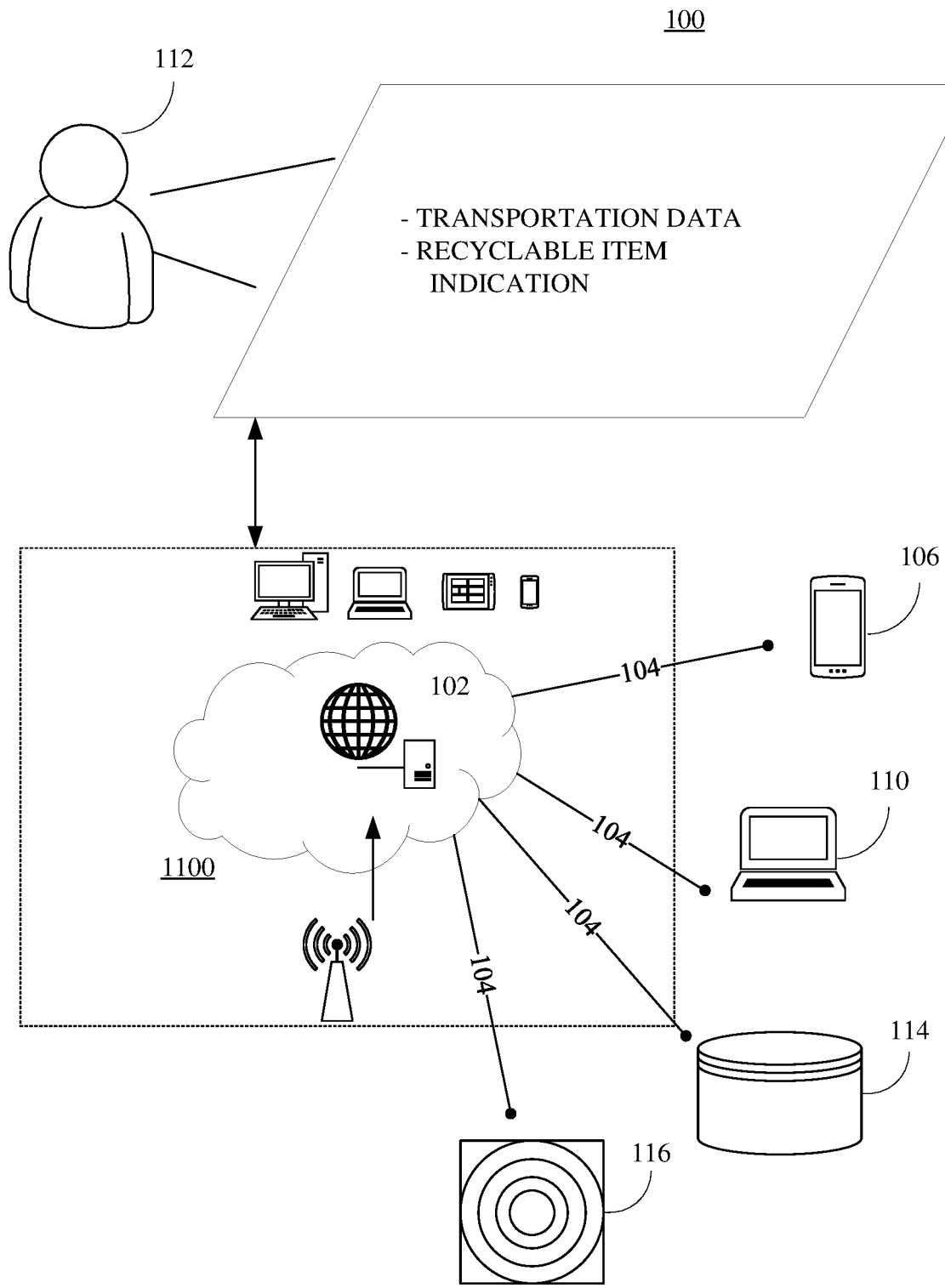
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of systems and methods for facilitating generation of a carbon offset based on processing of a recyclable item, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a blockchain, a third-party database, a public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data finger-printing, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or possession of one or more embodied characteristics unique to the user (e.g. biometric variables such as but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes systems and methods for facilitating generation of a carbon offset based on processing of a recyclable item. Further, the present disclosure may seek to record the carbon offset that may be generated by recycling a product and measuring the distance that a material/product has traveled, from a point of pickup to the point at which it is processed and recycled into a new raw material, and storing that value in a transaction that will be recorded on Blockchain.

Further, the present disclosure may involve:

Calculating Distance: Further, the disclosed system may record the GPS coordinates and address, of each pickup that occurs. Further, the disclosed system may record multiple GPS coordinates of the vehicle used to transport the material as it travels between recorded pickup and drop off locations. Further, the system may calculate the distance of the path traveled to the destination drop off-site and also tracks the type of vehicle used to transport the material. Further, the system may calculate the amount of the carbon footprint or carbon generated during the transportation of the material. The values, all of which may be also written on the Blockchain. Further, the values may include weight, volume, material type, product type, vehicle type, fuel type, fuel efficiency (MpG), distance, pickup location, drop off location, topography, and climate. Further, the values may then be used to calculate the Net Carbon Value generated. Further, the Net Carbon Value may be netted against the carbon offset produced by recycling the material. If the Net value is negative, as in a surplus of carbon offset, then the system may determine that in the total activity of recycling the materials/product, a Carbon Offset is generated.

Recommending Optimal Route: Further, the disclosed system may include more Processors Facilities, MRFs (Material Recovery Facilities), and Manufacturer location. Further, the disclosed system may be able to preemptively recommend the shortest transportation path for materials to maximize Carbon Offset produced by reducing the distance traveled. By rewarding the stakeholders in recycling chain with tokens whose value represent their contribution to the carbon offset produced, the disclosed system may create an incentivization system that may encourage the actors in the recycling value chain to want to create the most direct recycling supply chains as this may increase the yield in carbon offset generated by recycling.

For example: If a stakeholder scans a Barcode of a Coca-Cola Can or any other product, the system may immediately determine the weight of the product and the material that was used to make it (e.g. PET or aluminum). If the system were to have a database with a list of all product details (much like a supermarket has), then the system may use that database to figure out how much of a carbon footprint in terms of weight and material type the product has. By recycling the product the system may derive the net value of $CO_2e$ that is offset. (please refer to a table 1200 shown in FIG. 12). By recycling the product using the most efficient supply chain (limited processing across a shorter distance of transportation), the offset will be less affected by the carbon value associated with the transportation and processing of that product.

FIG. 1 is an illustration of an online platform 100 consistent with various embodiments of the present disclosure. By way of non-limiting example, the online platform 100 to facilitate generation of a carbon offset based on processing of a recyclable item may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web-based software application or browser. The web-based software application may be embodied as, for example, but not be limited to, a website, a web application, a desktop application, and a mobile application compatible with a computing device 1100.

Figure 2:
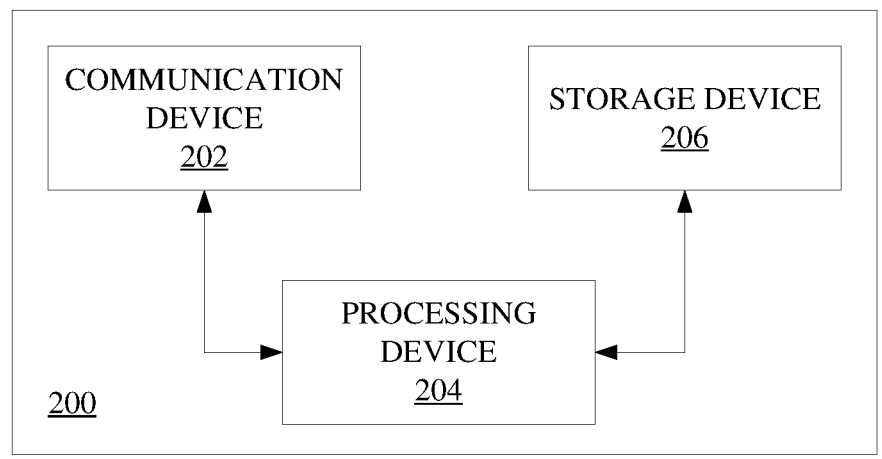
FIG. 2 is a block diagram of a system for facilitating generation of a carbon offset based on processing of a recyclable item, in accordance with some embodiments.

FIG. 2 is a block diagram of a system 200 for facilitating generation of a carbon offset based on processing of a recyclable item, in accordance with some embodiments. Accordingly, the system 200 may include a communication device 202, a processing device 204, and a storage device 206.

Further, the communication device 202 may be configured for receiving transportation data associated with transportation of at least one recyclable item from at least one first device. Further, the transportation data may include vehicle data associated with at least one vehicle used for transportation of the at least one recyclable item. Further, the vehicle data may include at least one vehicle type associated with the at least one vehicle, at least one fuel type associated with the at least one vehicle, and at least one vehicle travel characteristic associated with the at least one vehicle. Further, the at least one vehicle travel characteristic may include at least one of a fuel consumption and a plurality of geographical coordinates. Further, the plurality of geographical coordinates may include a series of GPS coordinates associated with the at least one vehicle. Further, the series of GPS coordinates may correspond to at least distance travelled by the at least one vehicle. Further, the at least one recyclable item may include paper-based products, such as used notebooks, newspapers, cardboard boxes, plastic-based products such as plastic bottles, carry bags, glass-based products, including windows, and bottles, metal-based products, including ferrous, and non-ferrous metal-based products, a combination therein, brand or product labels, and so on. Further, the at least one first device may include a mobile device 106 (such as a smartphone, a laptop, a tablet computer, etc.), other electronic devices 110 (such as desktop computers, server computers, etc.). Further, the at least one first device may correspond to a first user. Further, the first user may include at least one of a government agency, an NGO, a non-profit organization, a for-profit organization, and an individual. Further, in an embodiment, the at least one first device may include at least one sensor. Further, the at least one sensor may include a vehicle sensor configured for detecting the at least one vehicle type, a fuel sensor for detecting the at least one fuel type, a fuel consumption sensor configured for detecting the fuel consumption, and a vehicle position sensor configured for detecting the plurality of geographical coordinates. Further, the at least one sensor may be configured for generating the transportation data based on the detecting. Further, the at least one first device may include an on-board diagnostics system (OBD). Further, the OBD may include a computer system that may continually monitor the at least one vehicle. Further, in an embodiment, the at least one sensor may be configured for generating the transportation data based on the mode of data collection, continually or at periodic intervals throughout the duration of the at least one transportation journey of the at least once vehicle. Further, the at least one sensor may be configured for generating the transportation data of the at least once vehicle when the at least one vehicle is in motion and is stationary, and is located at and between the at least one origin and the at least one destination of the at least one transportation journey of the at least one vehicle.

Further, the processing device 204 may be configured for analyzing the transportation data. Further, the processing device 204 may be configured for determining a carbon value associated with the transportation of the at least one recyclable item based on the analyzing. Further, the processing device 204 may be configured for generating a net $CO_2e$ offset associated with the at least one recyclable item based on the carbon value. Further, the net $CO_2e$ offset may include an offset of a carbon dioxide equivalent ($CO_2e$). Further, the $CO_2e$ may mean the number of metric tons of $CO_2$ emissions with the same global warming potential as one metric ton of another greenhouse gas. Further, the greenhouse gas may include carbon dioxide gas ($CO_2$), methane ($CH_4$), nitrous oxide ($N_2O$), fluorinated gases, etc.

Further, the storage device 206 configured for storing at least one of the net $CO_2e$ offset and the carbon value associated with the at least one recyclable item in a distributed ledger. Further, the distributed ledger may include a block-chain, a hashgraph, etc.

Further, in some embodiments, the communication device 202 may be configured for receiving at least one recyclable item indication associated with the at least one recyclable item from at least one second device. Further, the at least one second device may include a mobile device 106 (such as a smartphone, a laptop, a tablet computer, etc.), other electronic devices 110 (such as desktop computers, server computers, etc.). Further, the at least one second device may correspond to a second user. Further, the second user may include an individual, a business, a manufacturing facility, or a government agency associated with a recycling process of the at least one recyclable item. Further, the storage device 206 may be configured for retrieving at least one recyclable item data associated with the at least one recyclable item from the distributed ledger. Further, the at least one recyclable item data may include a proof of impact data of the at least one recyclable item. Further, the proof of impact data may include recycling data corresponding to at least one of a raw material reduction and the $CO_2e$ offset. Further, the proof of impact data may include recycling data corresponding to at least one of a carbon value of at least one raw material extraction and processing data and the $CO_2e$ offset. Further, the processing data may be associated with the processing of the at least one recyclable item. Further, the recycling data may include a description of one or more recycling processes to recycle the at least one recyclable item. For instance, the one or more recycling processes may include sorting the at least one recyclable item, including separating plastic-based products, paper-based products, and metal-based products from the at least one recyclable item, rinsing, including cleaning the at least one recyclable item to rid contaminants, colorants or additives. Further, the one or more recycling processes may include reclamation of the at least one recyclable item. For instance, if the at least one recyclable item includes plastic-based products, reclamation may include feeding plastic into grinders to be flaked and cleaned, and melting flakes of plastics into corresponding individual polymers and re-formed into pellets, or chemically recycled through processes such as depolymerization, decomposition or conversion and re-formed into chemical components, monomers or petroleum products. Further, if the at least one recyclable item includes glass-based products, reclamation may include crushing the glass into small pieces (cullet). Further, the cullet may be blended with virgin material, or placed in a furnace and melted to be converted directly into new glass containers. Further, if the at least one recyclable item includes metal-based products, reclamation may include chopping, stripping, and cleaning the metals, and then smelting the metals at high temperatures, such as 2,800 degrees Fahrenheit. Further, the molten metal liquid may be recast into ingots. Further, the storage device 206 may be configured for storing at least one of a $CO_2e$ offset and a carbon value of the at least one recyclable item in the distributed ledger. Further, the generation of the net $CO_2e$ offset may be based on the $CO_2e$ offset. Further, the processing device 204 may be configured for analyzing the at least one recyclable item data. Further, the processing device 204 may be configured for determining at least one of the $CO_2e$ offset and the carbon value of the at least one recyclable item based on the analyzing of the at least one recyclable item data. Further, machine learning analysis may be performed on historical data associated with the at least one recyclable item in order to determine the one or more predefined conditions. For instance, the machine learning analysis on the historical data may determine a correlation between one or more contextual variables and performance of the one or more steps of the method.

Further, in some embodiments, the generating of the net $CO_2e$ offset may include subtracting the carbon value from the $CO_2e$ offset to yield the net $CO_2e$ offset. Further, in some embodiments, the at least one second device may include at least one sensor. Further, the at least one sensor may be configured for scanning the at least one recyclable item. Further, the at least one sensor may be configured for generating the at least one recyclable item indication based on the scanning.

Further, in some embodiments, the transportation data may include at least one pick-up location and at least one drop-off location associated with the at least one recyclable item. Further, the processing device 204 may be configured for determining a plurality of routes based on the at least one pick-up location and the at least one drop-off location. Further, the processing device 204 may be configured for determining a plurality of carbon values associated with the plurality of routes. Further, the processing device 204 may be configured for analyzing the plurality of routes and the plurality of carbon values corresponding to the plurality of routes using a traveling salesman problem algorithm. Further, the processing device 204 may be configured for determining an optimal route based on the analyzing of the plurality of routes and the plurality of carbon values corresponding to the plurality of routes. Further, the determining may be based on the at least one vehicle type, the at least one fuel type, and the at least one vehicle travel characteristic. Further, the at least one vehicle traverses along the optimal route for the transportation of the at least one recyclable item. Further, in some embodiments, the communication device 202 may be configured for receiving at least one transportation variable associated with the at least one route from the at least one first device. Further, the at least one transportation variable may include a distance variable, a traffic variable, a road elevation variable, etc. Further, the traffic variable may include traffic associated with the at least one route. Further, the road elevation variable may include path elevation associated with the at least one route. Further, the determining of the optimal route may be based on the at least one transportation variable. Further, in some embodiments, the communication device 202 may be configured for receiving at least one recyclable item information associated with the at least one recyclable item from the at least one first device. Further, the at least one recyclable item information may include a recyclable item weight. Further, the determining of the optimal route may be based on the at least one recyclable item information.

Further, in some embodiments, the processing device 204 may be configured for generating a carbon offset token based on the net $CO_2e$ offset. Further, the carbon offset token may be associated with a monetary denomination of a plurality of monetary denominations. Further, the storage device 206 may be configured for storing the carbon offset token in the distributed ledger. Further, in some embodiments, the communication device 202 may be configured for receiving at least one recyclable item indication associated with the at least one recyclable item from at least one second device. Further, the at least one second device may include a mobile device 106 (such as a smartphone, a laptop, a tablet computer, etc.), other electronic devices 110 (such as desktop computers, server computers, etc.). Further, the storage device 206 may be configured for retrieving at least one recyclable item data associated with the at least one recyclable item from the distributed ledger. Further, the at least one recyclable item data may include a proof of provenance data of the at least one recyclable item. Further, the proof of provenance data may include recycling data corresponding to at least one of a quality of at least one recyclable item associated with the recycling process, a quantity of the at least one recyclable item, and a quantity of non-recyclable items associated with the recycling process. Further, the proof of provenance data may include an origin and ownership data. Further, the processing device 204 may be configured for analyzing the at least one recyclable data. Further, the processing device 204 may be configured for identifying at least one stakeholder of the at least one recyclable item based on the analyzing of the at least one recyclable data. Further, the processing device 204 may be configured for issuing the carbon offset token of a monetary denomination to the at least one stakeholder.

Figure 3:
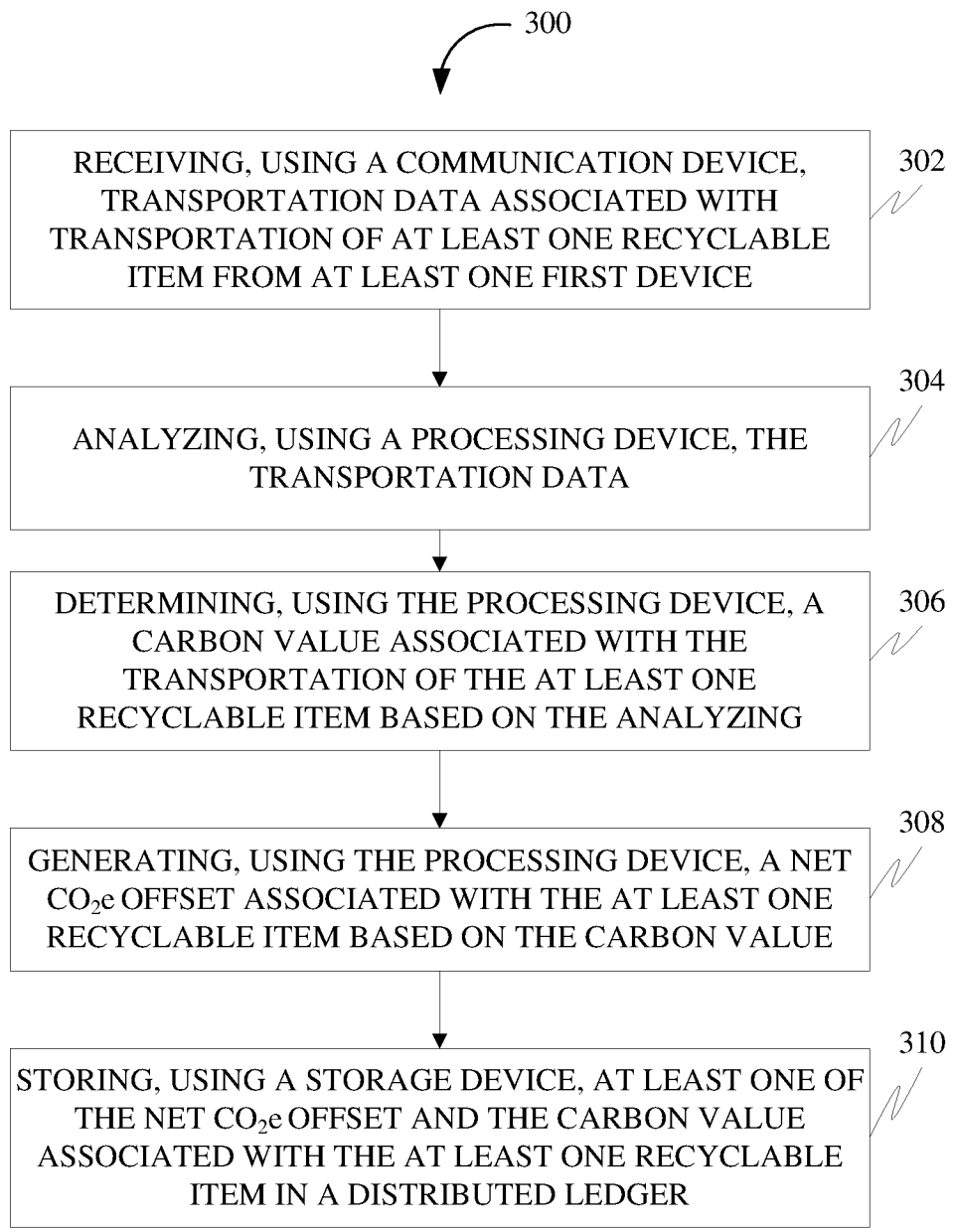
FIG. 3 is a flowchart of a method for facilitating generation of a carbon offset based on processing of a recyclable item, in accordance with some embodiments.

FIG. 3 is a flowchart of a method 300 for facilitating generation of a carbon offset based on processing of a recyclable item, in accordance with some embodiments.

Accordingly, at 302, the method 300 may include a step of receiving, using a communication device, transportation data associated with transportation of at least one recyclable item from at least one first device. Further, the transportation data may include vehicle data associated with at least one vehicle used for transportation of the at least one recyclable item. Further, the vehicle data may include at least one vehicle type associated with the at least one vehicle, at least one fuel type associated with the at least one vehicle, and at least one vehicle travel characteristic associated with the at least one vehicle. Further, the at least one vehicle travel characteristic may include at least one of a fuel consumption and a plurality of geographical coordinates. Further, the plurality of geographical coordinates may include a series of GPS coordinates associated with the at least one vehicle. Further, the series of GPS coordinates may correspond to at least distance travelled by the at least one vehicle. Further, the at least one recyclable item may include paper-based products, such as used notebooks, newspapers, cardboard boxes, plastic-based products such as plastic bottles, carry bags, glass-based products, including windows, and bottles, metal-based products, including ferrous, and non-ferrous metal-based products, a combination therein, brand or product labels, and so on. Further, the at least one first device may include a mobile device 106 (such as a smartphone, a laptop, a tablet computer, etc.), other electronic devices 110 (such as desktop computers, server computers, etc.). Further, the at least one first device may correspond to a first user. Further, the first user may include at least one of a government agency, an NGO, a non-profit organization, a for-profit organization, and an individual. Further, in an embodiment, the at least one first device may include at least one sensor. Further, the at least one sensor may include a vehicle sensor configured for detecting the at least one vehicle type, a fuel sensor for detecting the at least one fuel type, a fuel consumption sensor configured for detecting the fuel consumption, and a vehicle position sensor configured for detecting the plurality of geographical coordinates. Further, the at least one sensor may be configured for generating the transportation data based on the detecting. Further, the at least one first device may include an on-board diagnostics system (OBD). Further, the OBD may include a computer system that may continually monitor the at least one vehicle. Further, an embodiment, the at least one sensor may be configured for generating the transportation data based on the mode of data collection, continually or at periodic intervals throughout the duration of the at least one transportation journey of the at least once vehicle. Further, the at least one sensor may be configured for generating the transportation data of the at least once vehicle when the at least one vehicle is in motion and is stationary, and is located at and between the at least one origin and the at least one destination of the at least one transportation journey of the at least one vehicle.

Further, at 304, the method 300 may include a step of analyzing, using a processing device, the transportation data.

Further, at 306, the method 300 may include a step of determining, using the processing device, a carbon value associated with the transportation of the at least one recyclable item based on the analyzing.

Further, at 308, the method 300 may include a step of generating, using the processing device, a net $CO_2e$ offset associated with the at least one recyclable item based on the carbon value. Further, the net $CO_2e$ offset may include an offset of a carbon dioxide equivalent ($CO_2e$). Further, the $CO_2e$ may mean the number of metric tons of $CO_2$ emissions with the same global warming potential as one metric ton of another greenhouse gas. Further, the greenhouse gas may include carbon dioxide gas ($CO_2$), methane ($CH_4$), nitrous oxide ($N_2O$), fluorinated gases, etc.

Further, at 310, the method 300 may include a step of storing, using a storage device, at least one of the net $CO_2e$ offset and the carbon value associated with the at least one recyclable item in a distributed ledger. Further, the distributed ledger may include a block-chain, a hashgraph, etc.

Figure 4:
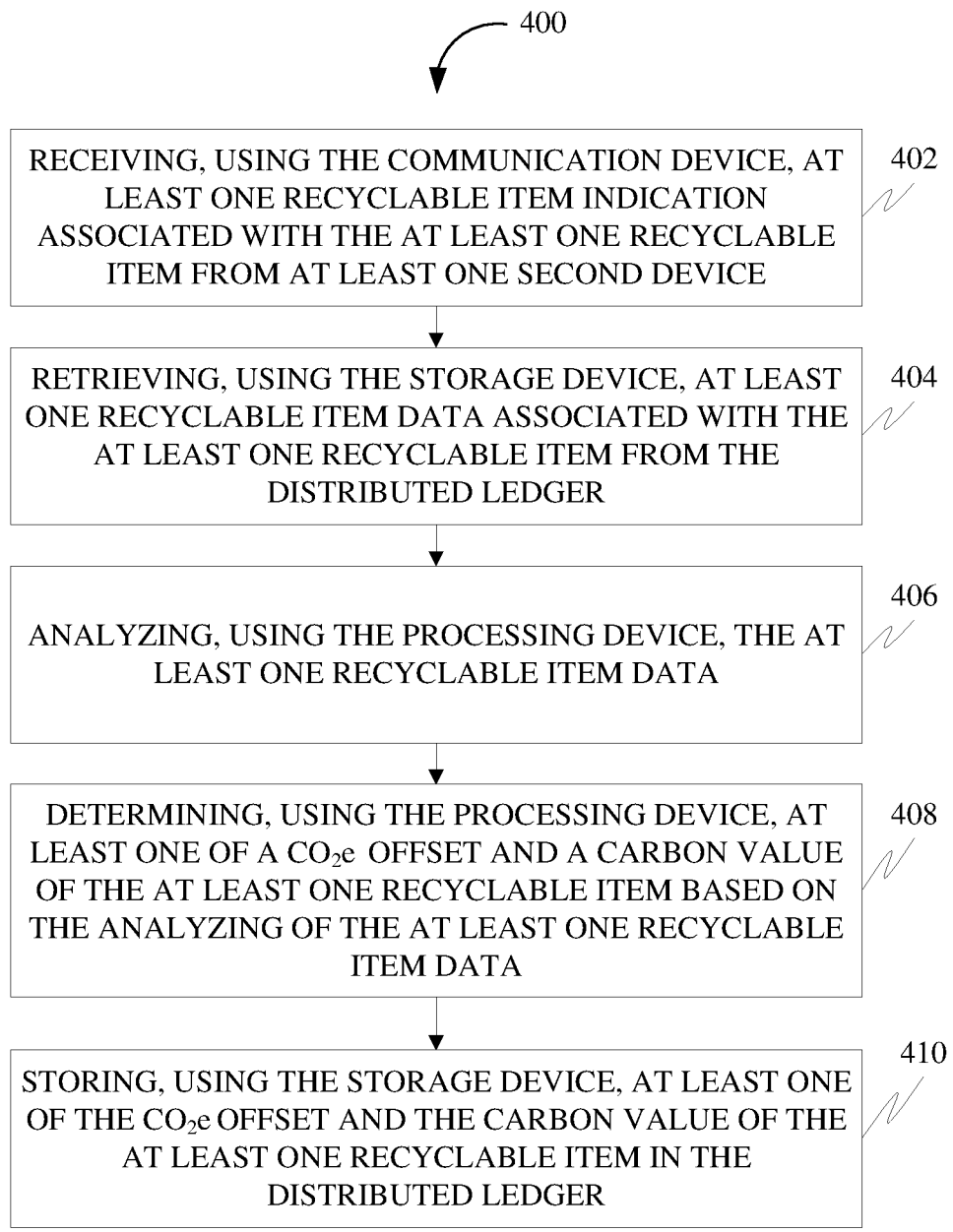
FIG. 4 is a flowchart of a method for facilitating the determination of a $CO_2e$ offset of a recyclable item, in accordance with some embodiments.

FIG. 4 is a flowchart of a method 400 for facilitating the determination of a $CO_2e$ offset of a recyclable item, in accordance with some embodiments. Accordingly, the $CO_2e$ offset may include an offset of a carbon dioxide equivalent ($CO_2e$). Further, the $CO_2e$ may mean the number of metric tons of $CO_2$ emissions with the same global warming potential as one metric ton of another greenhouse gas. Further, the greenhouse gas may include carbon dioxide gas ($CO_2$), methane ($CH_4$), nitrous oxide ($N_2O$), fluorinated gases, etc. Further, at 402, the method 400 may include a step of receiving, using the communication device, at least one recyclable item indication associated with the at least one recyclable item from at least one second device. Further, the at least one second device may include a mobile device 106 (such as a smartphone, a laptop, a tablet computer, etc.), other electronic devices 110 (such as desktop computers, server computers, etc.). Further, the at least one second device may correspond to a second user. Further, the second user may include an individual, a business, a manufacturing facility, or a government agency associated with a recycling process of the at least one recyclable item.

Further, at 404, the method 400 may include a step of retrieving, using the storage device, at least one recyclable item data associated with the at least one recyclable item from the distributed ledger. Further, the at least one recyclable item data may include a proof of impact data of the at least one recyclable item. Further, the proof of impact data may include recycling data corresponding to at least one of a raw material reduction and the $CO_2e$ offset. Further, the proof of impact data may include recycling data corresponding to at least one of a carbon value of at least one raw material extraction and processing data and the $CO_2e$ offset. Further, the processing data may be associated with the processing of the at least one recyclable item. Further, the recycling data may include a description of one or more recycling processes to recycle the at least one recyclable item. For instance, the one or more recycling processes may include sorting the at least one recyclable item, including separating plastic-based products, paper-based products, and metal-based products from the at least one recyclable item, rinsing, including cleaning the at least one recyclable item to rid contaminants, colorants or additives. Further, the one or more recycling processes may include reclamation of the at least one recyclable item. For instance, if the at least one recyclable item includes plastic-based products, reclamation may include feeding plastic into grinders to be flaked and cleaned, and melting flakes of plastics into corresponding individual polymers and re-formed into pellets, or chemically recycled through processes such as depolymerization, decomposition or conversion and re-formed into chemical components, monomers or petroleum products. Further, if the at least one recyclable item includes glass-based products, reclamation may include crushing the glass into small pieces (cullet). Further, the cullet may be blended with virgin material, or placed in a furnace and melted to be converted directly into new glass containers. Further, if the at least one recyclable item includes metal-based products, reclamation may include chopping, stripping, and cleaning, and then smelting the metals at high temperatures, such as 2,800 degrees Fahrenheit. Further, the molten metal liquid may be recast into ingots.

Further, at 406, the method 400 may include a step of analyzing, using the processing device, the at least one recyclable item data.

Further, at 408, the method 400 may include a step of determining, using the processing device, at least one of a $CO_2e$ offset and a carbon value of the at least one recyclable item based on the analyzing of the at least one recyclable item data. Further, machine learning analysis may be performed on historical data associated with the at least one recyclable item in order to determine the one or more predefined conditions. For instance, the machine learning analysis on the historical data may determine a correlation between one or more contextual variables and performance of the one or more steps of the method.

Further, at 410, the method 400 may include a step of storing, using the storage device, at least one of the $CO_2e$ offset and the carbon value of the at least one recyclable item in the distributed ledger. Further, the generation of the net $CO_2e$ offset may be based on the $CO_2e$ offset.

Further, in some embodiments, the generating of the net $CO_2e$ offset may include subtracting the carbon value from the $CO_2e$ offset to yield the net $CO_2e$ offset.

Further, in some embodiments, the at least one second device may include at least one sensor. Further, the at least one sensor may be configured for scanning the at least one recyclable item. Further, the at least one sensor may be configured for generating the at least one recyclable item indication based on the scanning.

Further, in some embodiments, the at least one second device may include at least one sensor. Further, the at least one sensor may be configured for detecting the at least one recyclable item. Further, the at least one sensor may be configured for generating the at least one recyclable item data associated with the at least one recyclable item one based on the detecting.

Figure 5:
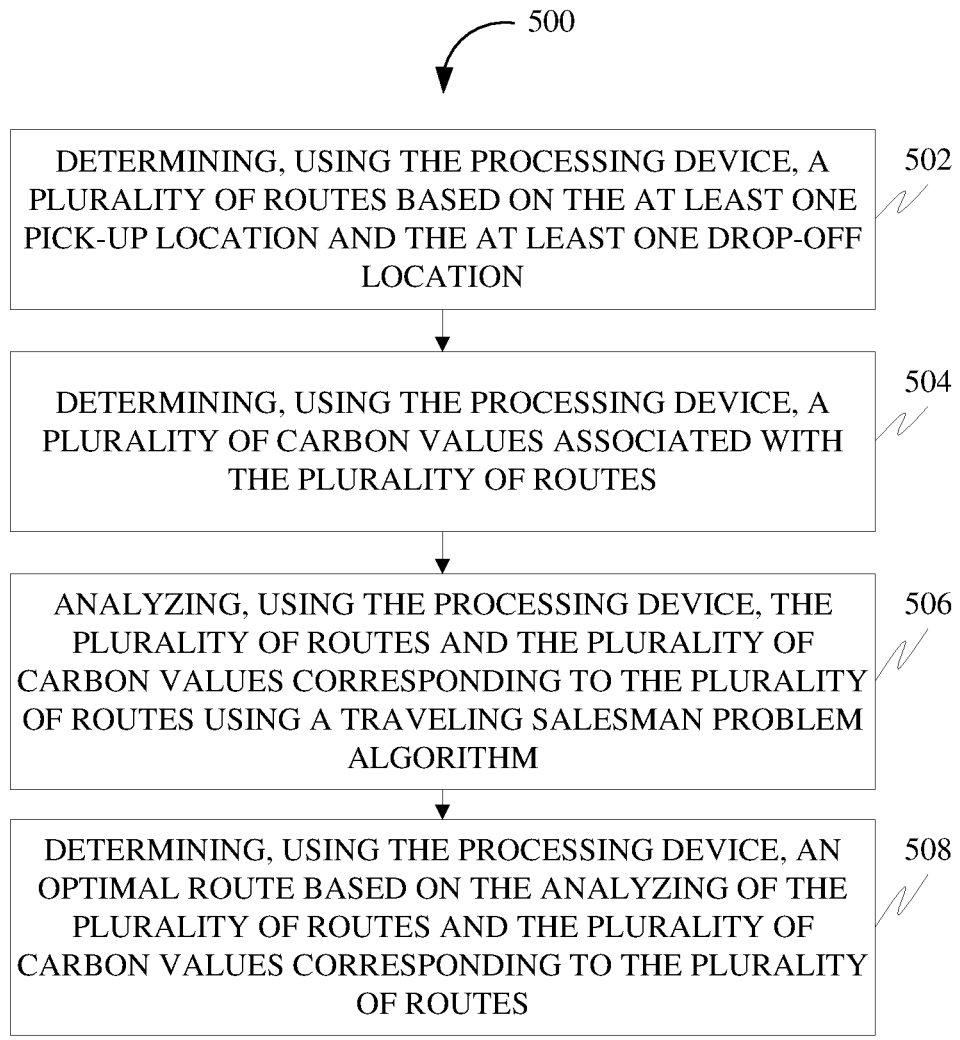
FIG. 5 is a flowchart of a method for facilitating the determination of an optimal route, in accordance with some embodiments.

FIG. 5 is a flowchart of a method 500 for facilitating the determination of an optimal route, in accordance with some embodiments. Further, in some embodiments, the transportation data may include at least one pick-up location and at least one drop-off location associated with the at least one recyclable item.

Further, at 502, the method 500 may include a step of determining, using the processing device, a plurality of routes based on the at least one pick-up location and the at least one drop-off location.

Further, at 504, the method 500 may include a step of determining, using the processing device, a plurality of carbon values associated with the plurality of routes.

Further, at 506, the method 500 may include a step of analyzing, using the processing device, the plurality of routes and the plurality of carbon values corresponding to the plurality of routes using a traveling salesman problem algorithm.

Further, at 508, the method 500 may include a step of determining, using the processing device, an optimal route based on the analyzing of the plurality of routes and the plurality of carbon values corresponding to the plurality of routes. Further, the determining may be based on the at least one vehicle type, the at least one fuel type, and the at least one vehicle travel characteristic. Further, the at least one vehicle traverses along the optimal route for the transportation of the at least one recyclable item.

Further, in some embodiments, the method 500 may include a step of receiving, using the communication device, at least one transportation variable associated with the at least one route from the at least one first device. Further, the at least one transportation variable may include a distance variable, a traffic variable, an elevation variable, etc. Further, the traffic variable may include traffic associated with the at least one route. Further, the elevation variable may include path elevation associated with the at least one route. Further, the determining of the optimal route may be based on the at least one transportation variable.

Further, in some embodiments, the method 500 may include a step of receiving, using the communication device, at least one recyclable item information associated with the at least one recyclable item from the at least one first device. Further, the at least one recyclable item information may include a recyclable item weight. Further, the determining of the optimal route may be based on the at least one recyclable item information. Further, the at least one first device may include a weight sensor. Further, the weight sensor may be configured for generating the recycle item weight of the at least one recyclable item.

Figure 6:
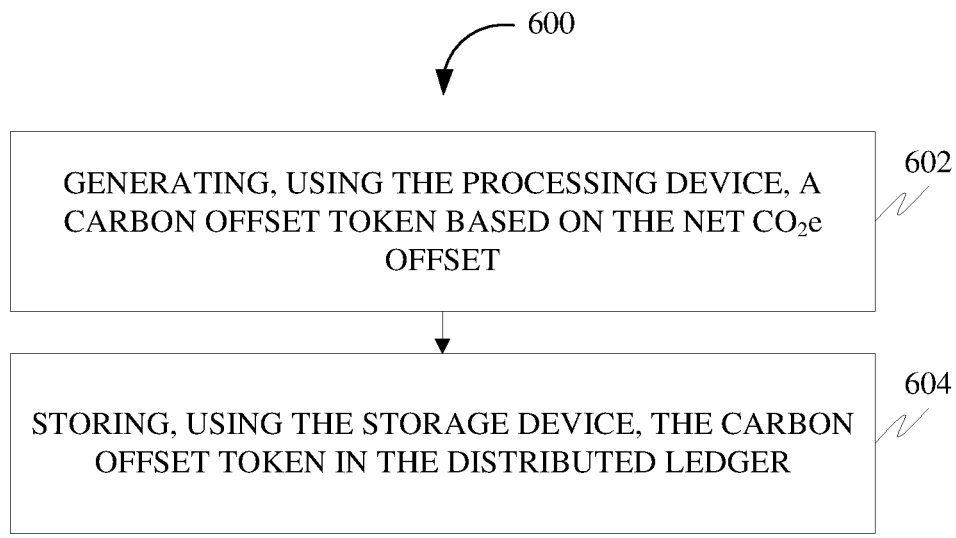
FIG. 6 is a flowchart of a method for facilitating the generation of a carbon offset token, in accordance with some embodiments.

FIG. 6 is a flowchart of a method 600 for facilitating the generation of a carbon offset token, in accordance with some embodiments. Accordingly, at 602, the method 600 may include a step of generating, using the processing device, a carbon offset token based on the net $CO_2e$ offset. Further, the carbon offset token may be associated with a monetary denomination of a plurality of monetary denominations.

Further, at 604, the method 600 may include a step of storing, using the storage device, the carbon offset token in the distributed ledger.

Figure 7:
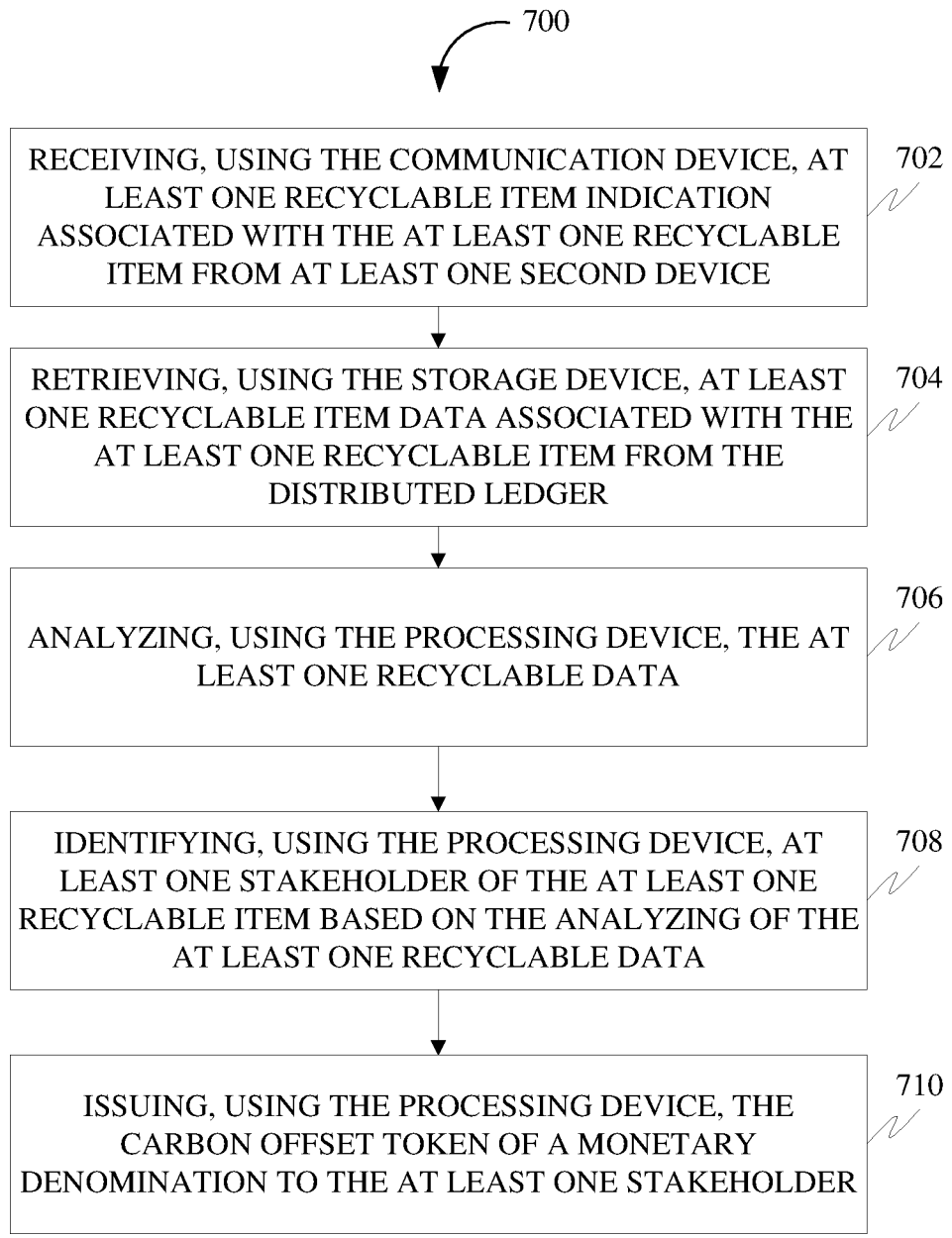
FIG. 7 is a flowchart of a method for facilitating the identification of a stakeholder of a recyclable item, in accordance with some embodiments.

FIG. 7 is a flowchart of a method 700 for facilitating the identification of a stakeholder of a recyclable item, in accordance with some embodiments. Accordingly, at 702, the method 700 may include a step of receiving, using the communication device, at least one recyclable item indication associated with the at least one recyclable item from at least one second device. Further, the at least one second device may include a mobile device 106 (such as a smartphone, a laptop, a tablet computer, etc.), other electronic devices 110 (such as desktop computers, server computers, etc.).

Further, at 704, the method 700 may include a step of retrieving, using the storage device, at least one recyclable item data associated with the at least one recyclable item from the distributed ledger. Further, the at least one recyclable item data may include a proof of provenance (PoP) data of the at least one recyclable item. Further, the proof of provenance data may include recycling data corresponding to at least one of a quality of at least one recyclable item associated with the recycling process, a quantity of the at least one recyclable item, and a quantity of non-recyclable items associated with the recycling process. Further, the proof of provenance data may include an origin and ownership data.

Further, at 706, the method 700 may include a step of analyzing, using the processing device, the at least one recyclable data.

Further, at 708, the method 700 may include a step of identifying, using the processing device, at least one stakeholder of the at least one recyclable item based on the analyzing of the at least one recyclable data.

Further, at 710, the method 700 may include a step of issuing, using the processing device, the carbon offset token of a monetary denomination to the at least one stakeholder.

Figure 8:
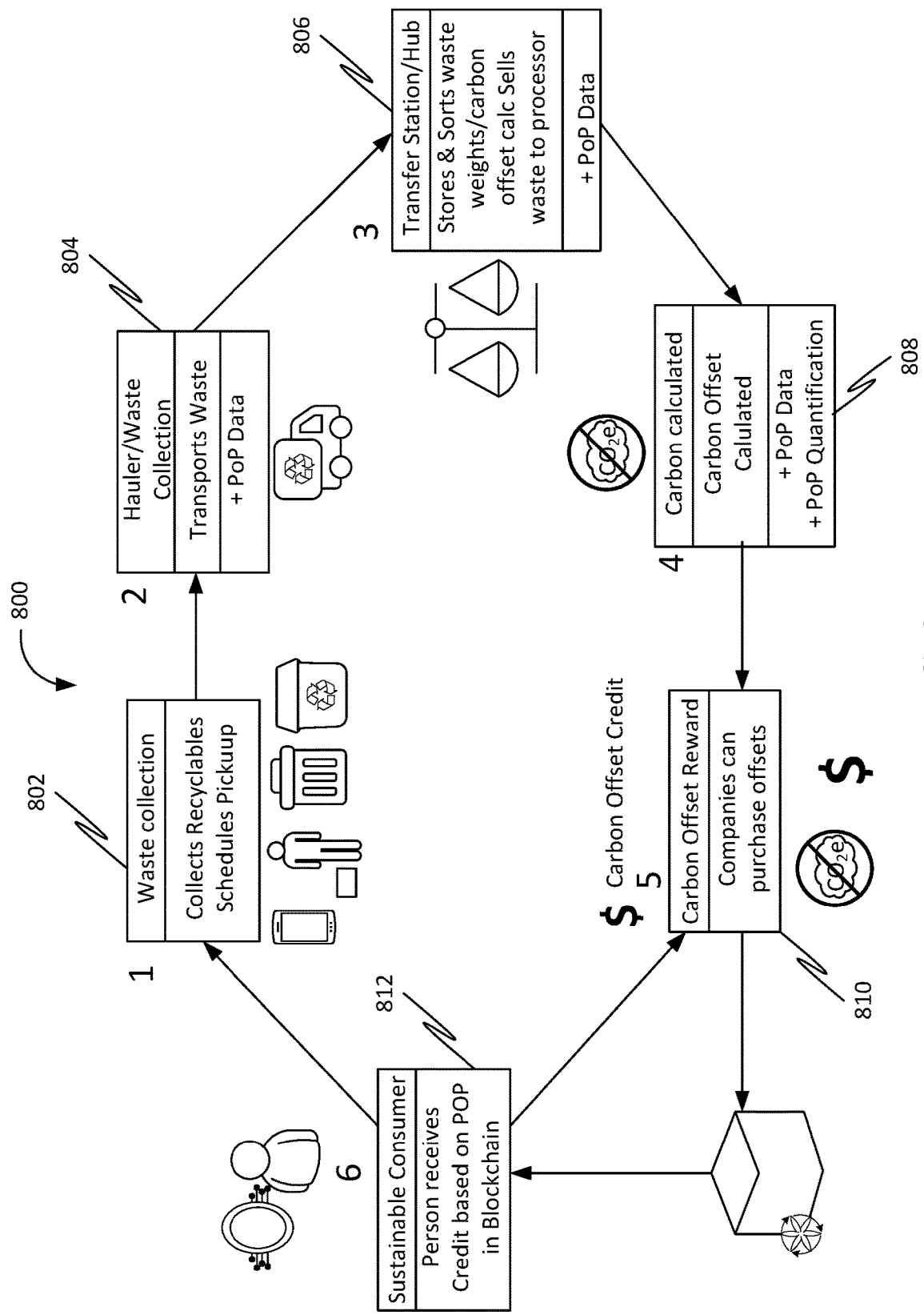
FIG. 8 is a flow diagram of a method for facilitating generation of a carbon offset reward based on processing of waste, in accordance with some embodiments.

FIG. 8 is a flow diagram of a method 800 for facilitating generation of a carbon offset reward based on processing of waste, in accordance with some embodiments. Accordingly, at 802, the method 800 may include a step of collecting the waste by an official. Further, the official may include a household, a business, a community, a government, an individual, etc. Further, the official may be associated with the PoP data. Further, the official may collect recyclables' based on schedule pickups. Further, at 804, the method 800 may include a step of collecting the waste from the official by a hauler. Further, the hauler may be associated with the PoP data. Further, the hauler may transport the waste to a desired location. Further, at 806, the method 800 may include a step of transferring the waste to a transfer station or hub. Further, the waste may be stored and sorted by the transfer station. Further, weight and carbon offset of the waste may be calculated at the transfer station. Further, at 808, the method 800 may include a step of calculating at least one of a carbon offset and a carbon offset associated with the waste. Further, at 810, the method 800 may include a step of generating a carbon offset reward/carbon offset credit. Further, the carbon offset reward/carbon offset credit may include the carbon offset token. Further, a company may purchase the carbon offset reward. Further, at 812, the method 800 may include a step of transmitting the carbon offset credit to a sustainable brand owner or stakeholder based on the PoP data in Blockchain.

Figure 9:
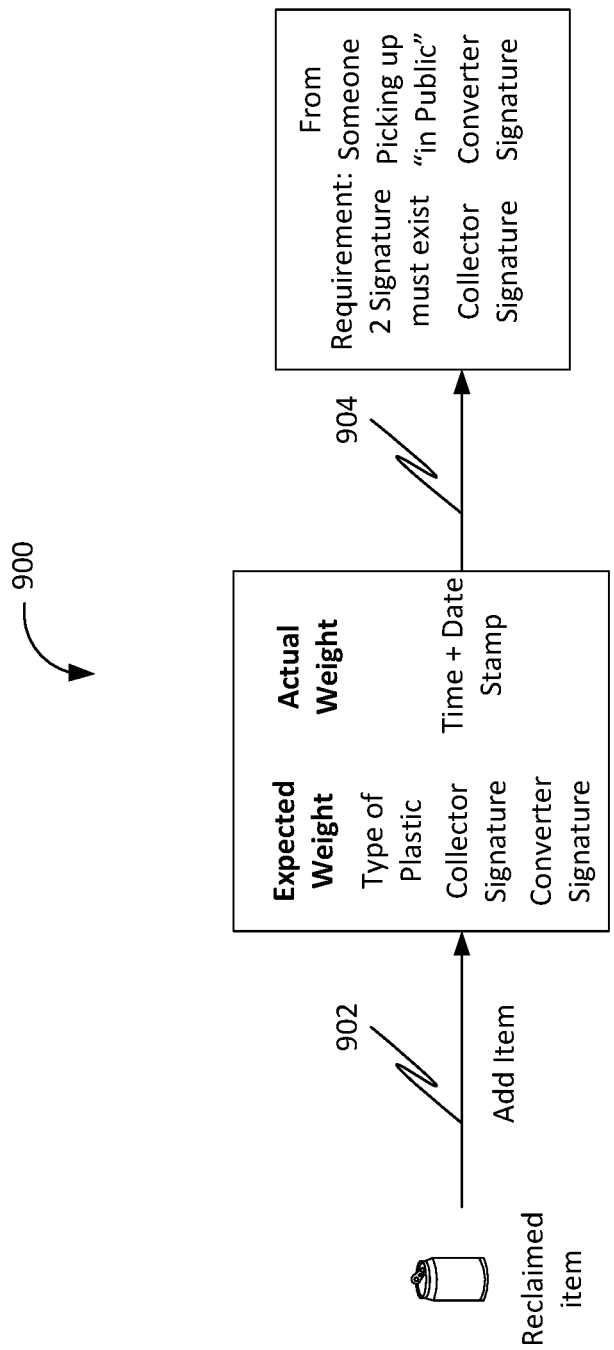
FIG. 9 is a flow diagram of a method for facilitating the addition of a reclaimed item, in accordance with some embodiments.

FIG. 9 is a flow diagram of a method 900 for facilitating the addition of a reclaimed item, in accordance with some embodiments. Accordingly, at 902, the method 900 may include a step of adding a reclaimed item. Further, the reclaimed item may be associated with a brand owner. Further, the reclaimed item may be associated with a QR code. Further, the QR code may include a name and an account. Further, the reclaimed item may be associated with an expected weight and an actual weight. Further, the expected weight may be associated with a type of plastic or other material. Further, the reclaimed item may include a collector signature, a converter signature, a time, and a date stamp. Further, at 904, the method 900 may include a step of collecting the reclaimed item. For the reclaimed item to be collected, the reclaimed item must include a collector signature and a converter signature.

Figure 10:
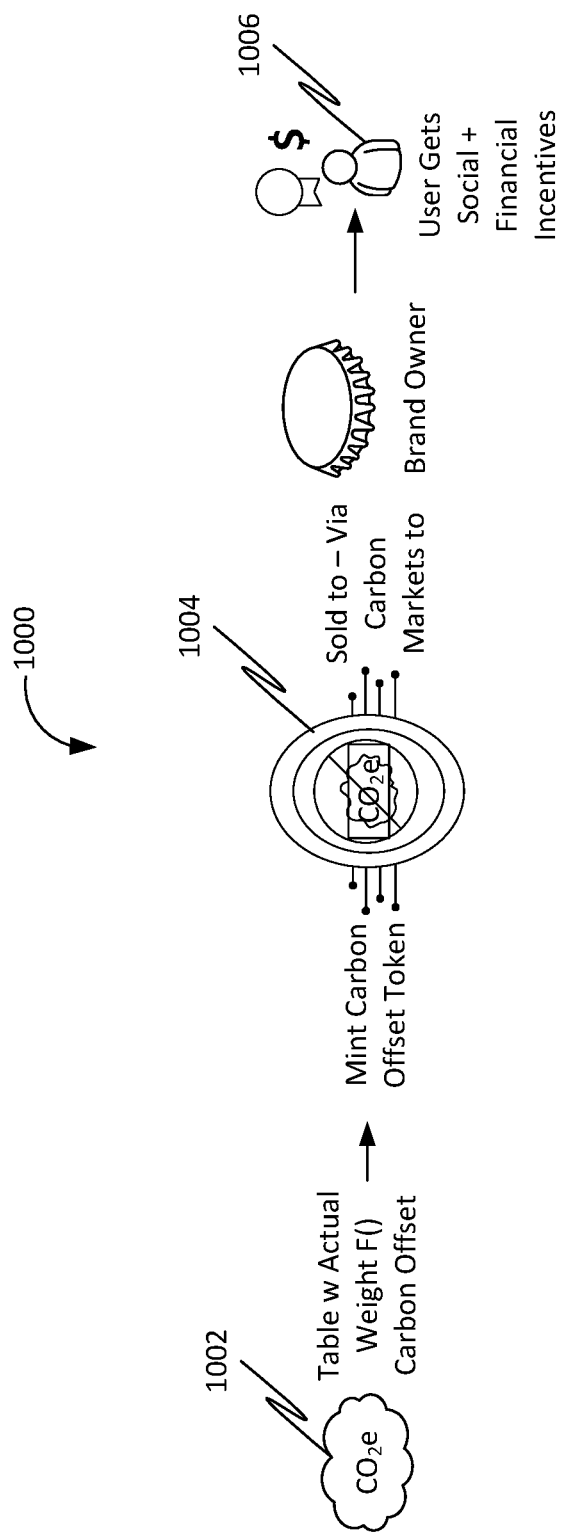
FIG. 10 is a flow diagram of a method for facilitating generation of a mint carbon offset token based on processing of a reclaimed item, in accordance with some embodiments.

Further, the addition of the reclaimed item may be a process flow of the benefits of the carbon determining and tracking system to the brand owner FIG. 10 is a flow diagram of a method 1000 for facilitating minting of a carbon offset token based on processing of a reclaimed item, in accordance with some embodiments. Accordingly, at 1002, the method 1000 may include a step of determining the weight of the reclaimed item and the at least one material associated with the reclaimed item. Further, at 1004, the method 1000 may include a step of minting carbon offset token that may be distributed, such as by means of sale or donation, a third party, such as a brand owner or governmental agency, via carbon markets. Further, the third party may be associated with the reclaimed item. Further, at 1006, the method 1000 may include a step of transmitting social and financial incentives to a user.

Figure 11:
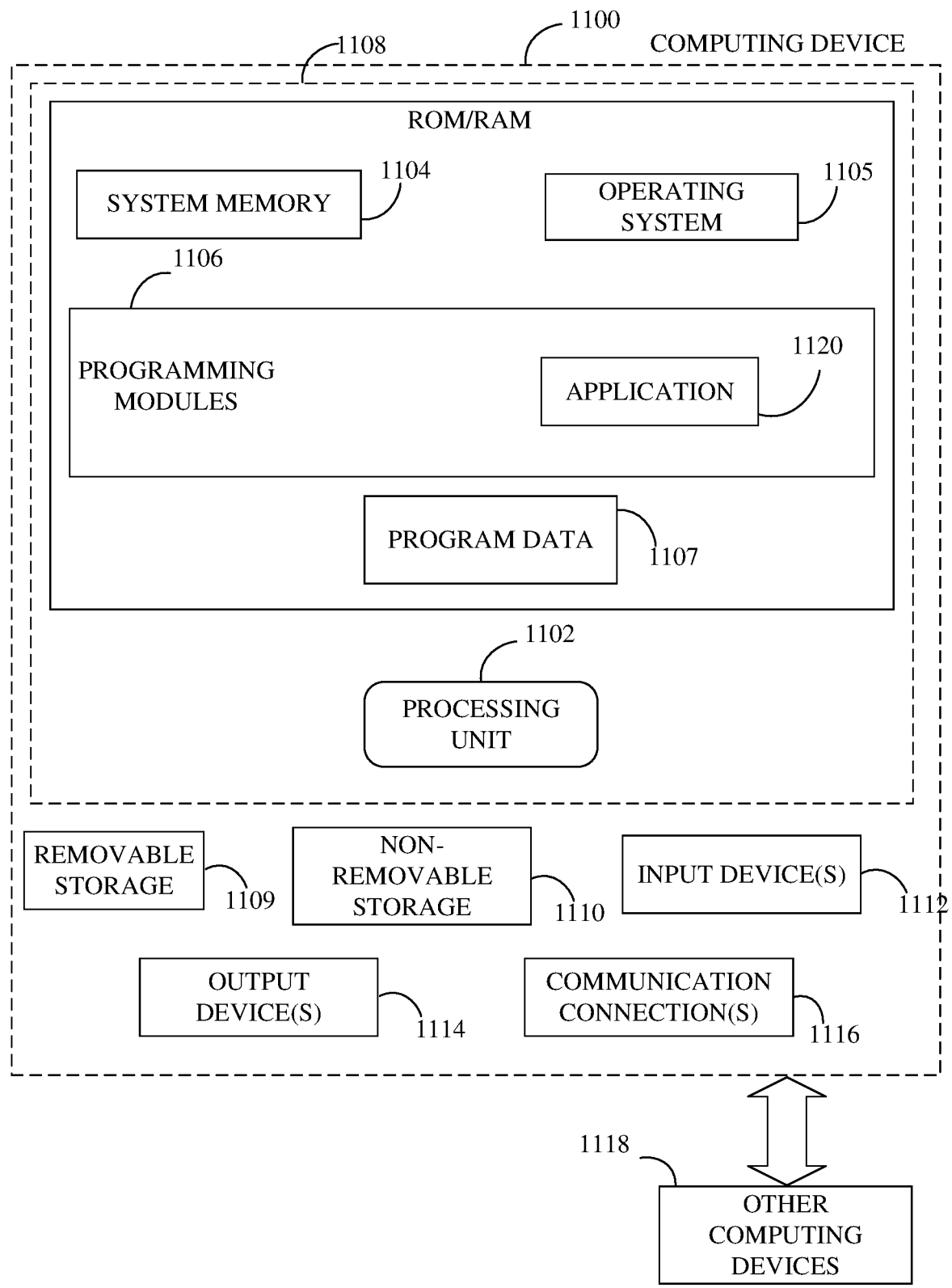
FIG. 11 is a block diagram of a computing device for implementing the methods disclosed herein, in accordance with some embodiments.

With reference to FIG. 11, a system consistent with an embodiment of the disclosure may include a computing device or cloud service, such as computing device 1100. In a basic configuration, computing device 1100 may include at least one processing unit 1102 and a system memory 1104. Depending on the configuration and type of computing device, system memory 1104 may comprise, but is not limited to, volatile (e.g. random-access memory (RAM)), non-volatile (e.g. read-only memory (ROM)), flash memory, or any combination. System memory 1104 may include operating system 1105, one or more programming modules 1106, and may include a program data 1107. Operating system 1105, for example, may be suitable for controlling computing device 1100's operation. In one embodiment, programming modules 1106 may include image-processing module, machine learning module. Furthermore, embodiments of the disclosure may be practiced in conjunction with a graphics library, other operating systems, or any other application program and is not limited to any particular application or system. This basic configuration is illustrated in FIG. 11 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by a removable storage 1109 and a non-removable storage 1110. Computer storage media may include volatile and non-volatile, removable and non-removable media implemented in any method or technology for storage of information, such as computer-readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, a location sensor, a camera, a biometric sensor, etc. Output device(s) 1114 such as a display, speakers, a printer, etc. may also be included. The aforementioned devices are examples and others may be used.

Computing device 1100 may also contain a communication connection 1116 that may allow device 1100 to communicate with other computing devices 1118, such as over a network in a distributed computing environment, for example, an intranet or the Internet. Communication connection 1116 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 1104, including operating system 1105. While executing on processing unit 1102, programming modules 1106 (e.g., application 1120 such as a media player) may perform processes including, for example, one or more stages of methods, algorithms, systems, applications, servers, databases as described above. The aforementioned process is an example, and processing unit 1102 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may, in fact, be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

FIG. 12 is the table 1200 listing providing carbon values of multiple recyclable items in accordance with exemplary embodiments. Further, the table 1200 may include a plurality of rows, a plurality of columns, and a plurality of cells. Further, a cell of the plurality of cells may be associated with a row and a column. Further, the plurality of columns may include emission 1202, PET bottle/Filament 1204, HDPE 1206, LDPE 1208, PP 1210, PS 1212, PVC 1214, and Other Plastics 1216. Further, the plurality of rows may include Virgin 1218 and Recycled 1220. Further, the plurality of cells may include a carbon value/emission in $CO_2$/metric-tonne corresponding to the row and the column. Further, the plurality of cells may include a carbon value/emission in $CO_2e$/metric-tonne corresponding to the row and the column. Further, the $CO_2e$ may mean the number of metric tons of $CO_2$ emissions with the same global warming potential as one metric ton of another greenhouse gas. Further, the greenhouse gas may include carbon dioxide gas ($CO_2$), methane ($CH_4$), nitrous oxide ($N_2O$), fluorinated gases, etc. Further, the Virgin 1218 and the recycled 1220 may be associated with the emission 1202. Further, a cell 1222 may include 2150/2050 $CO_2$/metric-tonne corresponding to the Virgin 1218 and the PET bottle/Filament 1204. Further, a cell 1224 may include 1800 $CO_2$/metric-tonne corresponding to the Virgin 1218 and the HDPE 1206. Further, a cell 1226 may include 1870 $CO_2$/metric-tonne corresponding to the Virgin 1218 and the LDPE 1208. Further, a cell 1228 may include 1630 $CO_2$/metric-tonne corresponding to the Virgin 1218 and the PP 1210. Further, a cell 1230 may include 3300 $CO_2$/metric-tonne corresponding to the Virgin 1218 and the PS 1212. Further, a cell 1232 may include 1900 $CO_2$/metric-tonne corresponding to the Virgin 1218 and the PVC 1214. Further, a cell 1234 may include 4860 $CO_2$/metric-tonne corresponding to the Virgin 1218 and the Other Plastics 1216. Further, a cell 1236 may include 510/280 $CO_2$/metric-tonne corresponding to the Recycled 1220 and the PET bottle/Filament 1204. Further, a cell 1238 may include 348 $CO_2$/metric-tonne corresponding to the Recycled 1220 and the HDPE 1206. Further, a cell 1240 may include 348 $CO_2$/metric-tonne corresponding to the Recycled 1220 and the LDPE 1208. Further, a cell 1242 may include 348 $CO_2$/metric-tonne corresponding to the Recycled 1220 and the PP 1210. Further, a cell 1244 may include 348 $CO_2$/metric-tonne corresponding to the Recycled 1220 and the PS 1212. Further, a cell 1246 may include 348 $CO_2$/metric-tonne corresponding to the Recycled 1220 and the PVC 1214. Further, a cell 1248 may include 348 $CO_2$/metric-tonne corresponding to the Recycled 1220 and the Other Plastics 1216. Further, the table 1200 may facilitate the determining of the net $CO_2e$ corresponding to the multiple recyclable items (products).

Although the present disclosure has been explained in relation to its preferred embodiment, it is to be understood that many other possible modifications and variations can be made without departing from the spirit and scope of the disclosure.

The invention claimed is:

1. A method for facilitating generation of a carbon offset of a recyclable item based on processing of the recyclable item, the method comprising:

receiving, using a communication device, transportation data associated with a transportation of the recyclable item between at least one pick-up location and at least one drop-off location from at least one first device comprising an on-board diagnostics system (OBD), wherein the first device is associated with the at least one vehicle, wherein the transportation data comprises vehicle data associated with at least one vehicle used for transportation of the recyclable item, wherein the vehicle data comprises at least one vehicle type associated with the at least one vehicle, at least one fuel type associated with the at least one vehicle, and at least one vehicle travel characteristic associated with the at least one vehicle, wherein the vehicle data comprises a fuel efficiency associated with the at least one vehicle, wherein the at least one vehicle travel characteristic comprises each of a fuel consumption and a plurality of geographical coordinates;

analyzing, using a processing device, the transportation data;

determining, using the processing device, a carbon value associated with the transportation of the recyclable item based on the analyzing;

retrieving, using a storage device, a $CO_2e$ offset associated with the recyclable item from a distributed ledger;

generating, using the processing device, a net $CO_2e$ offset associated with the recyclable item based on the carbon value and the $CO_2e$ offset;

storing, using the storage device, the net $CO_2e$ offset and the carbon value associated with the transportation of the recyclable item in the distributed ledger;

generating, using the processing device, a carbon offset token based on the net $CO_2e$ offset, wherein the carbon offset token is associated with a monetary denomination of a plurality of monetary denominations;

minting, using the processing device, the carbon offset token;

storing, using the storage device, the carbon offset token in the distributed ledger;

receiving, using the communication device, at least one recyclable item indication associated with the recyclable item from at least one second device associated with a recycling process of the recyclable item, wherein the recyclable item is transported by the at least one vehicle comprising the at least one first device associated with the at least one second device, wherein the at least one recyclable item indication is received from the second device for identifying at least one stakeholder of the recyclable item;

retrieving, using the storage device, at least one recyclable item data associated with the recyclable item from the distributed ledger, wherein the at least one recyclable item data is associated with the at least one recyclable item indication received from the at least one second device, wherein the at least one recyclable item data comprises a proof of provenance data of the recyclable item, wherein the proof of provenance data comprises at least one of origin and ownership data;

analyzing, using the processing device, the at least one recyclable item data associated with the recyclable item;

identifying, using the processing device, the at least one stakeholder of the recyclable item based on the analyzing of the at least one recyclable item data associated with the recyclable item; and issuing, using the processing device, the carbon offset token of a monetary denomination to the at least one stakeholder of the recyclable item.

2. The method of claim 1, wherein the at least one recyclable item data further comprises a proof of impact data of the recyclable item, wherein the proof of impact data comprises recycling data corresponding to a raw material reduction, wherein the at least one recyclable item data further comprises at least one of a collector signature and a converter signature, wherein the method further comprises determining, using the processing device, at least one of the $CO_2e$ offset and the carbon value of the recyclable item based on the analyzing of the at least one recyclable item data.

3. The method of claim 2, wherein the generating of the net $CO_2e$ offset comprises subtracting the carbon value from the $CO_2e$ offset to yield the net $CO_2e$ offset.

4. The method of claim 2, wherein the at least one second device comprises at least one sensor, wherein the at least one sensor is configured for scanning the recyclable item, wherein the at least one sensor is configured for generating the at least one recyclable item indication based on the scanning.

5. The method of claim 1, wherein the transportation data comprises at least one pick-up location and at least one drop-off location associated with the recyclable item, wherein the method comprises:

determining, using the processing device, a plurality of routes based on the at least one pick-up location and the at least one drop-off location;

determining, using the processing device, a plurality of carbon values associated with the plurality of routes;

analyzing, using the processing device, the plurality of routes and the plurality of carbon values corresponding to the plurality of routes using a traveling salesman problem algorithm; and determining, using the processing device, an optimal route based on the analyzing of the plurality of routes and the plurality of carbon values corresponding to the plurality of routes, wherein the determining is based on the at least one vehicle type, the at least one fuel type, and the at least one vehicle travel characteristic, wherein the at least one vehicle traverses along the optimal route for the transportation of the recyclable item.

6. The method of claim 5 further comprising receiving, using the communication device, at least one transportation variable associated with the at least one route from the at least one first device, wherein the determining of the optimal route is based on the at least one transportation variable.

7. The method of claim 5 further comprising receiving, using the communication device, at least one recyclable item information associated with the recyclable item from the at least one first device, wherein the at least one recyclable item information comprises a recyclable item weight, wherein the determining of the optimal route is based on the at least one recyclable item information.

8. The method of claim 1, wherein the at least one first device comprises at least one sensor, wherein the at least one sensor comprises a vehicle sensor configured for detecting the at least one vehicle type, a fuel sensor for detecting the at least one fuel type, a fuel consumption sensor configured for detecting the fuel consumption, and a vehicle position sensor configured for detecting the plurality of geographical coordinates, wherein the at least one sensor is configured for generating the transportation data based on the detecting.

9. A system for facilitating generation of a carbon offset of a recyclable item based on processing of the recyclable item, the system comprising:

a communication device configured for receiving transportation data associated with transportation of recyclable item between at least one pick-up location and at least one drop-off location from at least one first device comprising an on-board diagnostics system (OBD), wherein the first device is associated with the at least one vehicle, wherein the transportation data comprises vehicle data associated with at least one vehicle used for transportation of the recyclable item, wherein the vehicle data comprises at least one vehicle type associated with the at least one vehicle, at least one fuel type associated with the at least one vehicle, and at least one vehicle travel characteristic associated with the at least one vehicle, wherein the at least one vehicle type is associated with a fuel efficiency, wherein the at least one vehicle travel characteristic comprises each of a fuel consumption and a plurality of geographical coordinates;

a processing device configured for:
analyzing the transportation data;
determining a carbon value associated with the transportation of the recyclable item based on the analyzing;
minting the carbon offset token; and
generating a net $CO_2e$ offset associated with the recyclable item based on the carbon value and a $CO_2e$ offset associated with the recyclable item; and a storage device configured for:
retrieving the $CO_2e$ offset associated with the recyclable item from a distributed ledger;
storing the net $CO_2e$ offset and the carbon value associated with the transportation of the recyclable item in the distributed ledger, wherein the processing device is further configured for generating a carbon offset token based on the net $CO_2e$ offset, wherein the carbon offset token is associated with a monetary denomination of a plurality of monetary denominations, wherein the storage device is further configured for storing the carbon offset token in the distributed ledger, wherein the communication device is further configured for receiving at least one recyclable item indication associated with the recyclable item from at least one second device associated with a recycling process of the recyclable item, wherein the recyclable item is transported by the at least one vehicle comprising the at least one first device associated with the at least one second device, wherein the at least one recyclable item indication is received from the second device for identifying at least one stakeholder of the recyclable item wherein the storage device is further configured for retrieving at least one recyclable item data associated with the recyclable item from the distributed ledger, wherein the at least one recyclable item data is associated with the at least one recyclable item indication received from the at least one second device, wherein the at least one recyclable item data comprises a proof of provenance data of the recyclable item, wherein the proof of provenance data comprises at least one of origin and ownership data wherein the processing device is further configured for:

analyzing the at least one recyclable item data associated with the recyclable item;

identifying the at least one stakeholder of the recyclable item based on the analyzing of the at least one recyclable item data associated with the recyclable item; and issuing the carbon offset token of a monetary denomination to the at least one stakeholder of the recyclable item.

10. The system of claim 9, wherein the at least one recyclable item data further comprises a proof of impact data of the recyclable item, wherein the proof of impact data comprises recycling data corresponding to a raw material reduction, wherein the at least one recyclable item data further comprises at least one of a collector signature and a converter signature, wherein the processing device is further configured for determining at least one of the $CO_2e$ offset and the carbon value of the recyclable item based on the analyzing of the at least one recyclable item data.

11. The system of claim 10, wherein the generating of the net $CO_2e$ offset comprises subtracting the carbon value from the $CO_2e$ offset to yield the net $CO_2e$ offset.

12. The system of claim 10, wherein the at least one second device comprises at least one sensor, wherein the at least one sensor is configured for scanning the recyclable item, wherein the at least one sensor is configured for generating the at least one recyclable item indication based on the scanning.

13. The system of claim 9, wherein the transportation data comprises at least one pick-up location and at least one drop-off location associated with the recyclable item, wherein the processing device is further configured for:

determining a plurality of routes based on the at least one pick-up location and the at least one drop-off location;

determining a plurality of carbon values associated with the plurality of routes;

analyzing the plurality of routes and the plurality of carbon values corresponding to the plurality of routes using a traveling salesman problem algorithm; and determining an optimal route based on the analyzing of the plurality of routes and the plurality of carbon values corresponding to the plurality of routes, wherein the determining is based on the at least one vehicle type, the at least one fuel type, and the at least one vehicle travel characteristic, wherein the at least one vehicle traverses along the optimal route for the transportation of the recyclable item.

14. The system of claim 13, wherein the communication device is further configured for receiving at least one transportation variable associated with the at least one route from the at least one first device, wherein the determining of the optimal route is based on the at least one transportation variable.

15. The system of claim 13, wherein the communication device is further configured for receiving at least one recyclable item information associated with the recyclable item from the at least one first device, wherein the at least one recyclable item information comprises a recyclable item weight, wherein the determining of the optimal route is based on the at least one recyclable item information.

16. The system of claim 9, wherein the at least one first device comprises at least one sensor, wherein the at least one sensor comprises a vehicle sensor configured for detecting the at least one vehicle type, a fuel sensor for detecting the at least one fuel type, a fuel consumption sensor configured for detecting the fuel consumption, and a vehicle position sensor configured for detecting the plurality of geographical coordinates, wherein the at least one sensor is configured for generating the transportation data based on the detecting.

* * * * *